United States Patent
Tucker et al.

(10) Patent No.: US 8,243,764 B2
(45) Date of Patent: Aug. 14, 2012

(54) FREQUENCY CONVERSION OF A LASER BEAM USING A PARTIALLY PHASE-MISMATCHED NONLINEAR CRYSTAL

(76) Inventors: Derek A. Tucker, Santa Clara, CA (US); Dahv Kliner, Mountain View, CA (US); Lawrence E. Myers, Mountain View, CA (US); Martin H. Muendel, Oakland, CA (US)

(*) Notice: Subject to any disclaimer, the term of this patent is extended or adjusted under 35 U.S.C. 154(b) by 126 days.

(21) Appl. No.: 12/753,009

(22) Filed: Apr. 1, 2010

(65) Prior Publication Data

US 2011/0243161 A1 Oct. 6, 2011

(51) Int. Cl.
H01S 3/10 (2006.01)
H01S 3/00 (2006.01)
G02F 1/35 (2006.01)

(52) U.S. Cl. ............ 372/21; 372/22; 372/34; 359/326; 359/328

(58) Field of Classification Search ............ 372/21–22, 372/34, 36, 29.016; 359/326–332
See application file for complete search history.

(56) References Cited

U.S. PATENT DOCUMENTS

| | | | |
|---|---|---|---|
| 4,968,121 A | 11/1990 | Bruesselbach et al. | 359/328 |
| 5,179,562 A | 1/1993 | Marason et al. | 372/22 |
| 5,251,059 A | 10/1993 | Kouta | 359/326 |
| 5,680,412 A | 10/1997 | DeMaria et al. | 372/92 |
| 5,796,766 A | 8/1998 | Hargis et al. | 372/36 |
| 5,846,638 A | 12/1998 | Meissner | 428/220 |
| 5,898,718 A * | 4/1999 | Mohatt et al. | 372/22 |
| 6,381,255 B1 | 4/2002 | Van Saarloos et al. | 372/9 |
| 6,963,443 B2 | 11/2005 | Pfeiffer et al. | 359/330 |
| 7,218,653 B2 | 5/2007 | Masada et al. | 372/21 |
| 7,227,680 B2 | 6/2007 | Sekine et al. | 359/326 |
| 7,324,267 B2 | 1/2008 | Melloni et al. | 359/330 |
| 7,542,490 B2 | 6/2009 | Miller et al. | 372/21 |
| 7,742,221 B2 * | 6/2010 | Mizuuchi et al. | 359/328 |
| 2001/0031110 A1* | 10/2001 | Imajuku et al. | 385/15 |
| 2008/0037598 A1 | 2/2008 | Miller et al. | 372/21 |

(Continued)

FOREIGN PATENT DOCUMENTS

WO 0071342 11/2000

(Continued)

OTHER PUBLICATIONS

Okada et al., "Influences of Self-Induced Thermal Effects on Phase Matching in Nonlinear Optical Crystals", IEEE J. of Quantum Elecron., col. QE-7, No. 12, pp. 560-563, Dec. 1971.

(Continued)

Primary Examiner — Jessica Stultz
Assistant Examiner — Phillip Nguyen
(74) Attorney, Agent, or Firm — Matthew A. Pequignot; Pequignot + Myers LLC

(57) ABSTRACT

The invention relates to a laser system including a nonlinear crystal having a first length portion and a second length portion. The nonlinear crystal disposed to receive input light from the laser for converting the input light into frequency converted light; wherein the nonlinear crystal is configured so that the first length portion of the nonlinear crystal is phase matching for the input light and the frequency converted light, and the second length portion of the nonlinear crystal is phase mismatching for the input light and the frequency converted light. Phase mismatching means may include a temperature controlling board, a clamp, or electrodes.

8 Claims, 7 Drawing Sheets

U.S. PATENT DOCUMENTS

| | | |
|---|---|---|
| 2009/0237777 A1 | 9/2009 | Meissner et al. ............. 359/326 |
| 2010/0103088 A1* | 4/2010 | Yokoyama et al. ........... 345/102 |
| 2010/0165453 A1* | 7/2010 | Morikawa et al. ............ 359/328 |
| 2011/0013264 A1* | 1/2011 | Mu et al. ....................... 359/326 |

FOREIGN PATENT DOCUMENTS

| WO | WO 2008050802 A1 * | 5/2008 |
|---|---|---|
| WO | WO 2008093545 A1 * | 8/2008 |

OTHER PUBLICATIONS

Lundeman et al., "Threshold for Strong Thermal Dephasing in Periodically Poled KTP in External Cavity Frequency Doubling", Appl. Phys. B., pp. 827-831, Aug. 2009.

* cited by examiner

FREQUENCY CONVERSION OF A LASER BEAM USING A PARTIALLY PHASE-MISMATCHED NONLINEAR CRYSTAL

TECHNICAL FIELD

The present invention relates to a method of frequency conversion using a nonlinear optical material and to such a frequency conversion device.

BACKGROUND OF THE INVENTION

Optical nonlinear crystals are extensively used for frequency conversion of a fundamental laser wavelength to a new wavelength. Examples include conversion of 1064 nm light from neodymium-doped yttrium aluminium garnet (Nd:YAG) lasers to a wavelength of 532 nm using nonlinear crystals such as Potassium Dihydrogen Phosphate (KDP), Barium Borate (BBO), Lithium Triborate (LBO), Bismuth Borate (BiBO), and Potassium Titanyl Phosphate (KTP). This light at 532 nm can be further converted to 355 nm by summing the resultant 532 nm radiation with the remaining laser fundamental at 1064 nm in another crystal to generate 355 nm. The 532 nm can also be converted to 266 nm by doubling in crystals such as BBO, Cesium Dihydrogenarsenate (CDA), Potassium Fluoroboratoberyllate (KBBF) and Cesium Lithium Borate (CLBO). The 266 nm can be converted by summing with the fundamental at 1064 nm to get to wavelengths as short as 213 nm.

It is theoretically possible to attain conversion efficiencies of the fundamental laser wavelength to the desired wavelength range by as high as 100% for flat top spatial/temporal laser pulses. In practice, conversion efficiencies as high as 80-90% for second harmonic generation (SHG) and 30-40% for third harmonic generation (THG) to ultraviolet (UV) are attained using spatial-temporal shaped pulses and/or effective multi-pass operation of the nonlinear crystals. In practice, solid state lasers have been scaled to increasingly higher powers to attain significant brightness. For example, it is possible to produce continuous lasers with diffraction limited output at 1 KW, which corresponds to a focusable average power of more than $10^{11}$ W/cm$^2$. Despite the high power scaling capabilities of the fundamental laser source, it has not been possible to scale the nonlinear frequency conversion to take full advantage of the higher power inputs.

The surface damage is especially relevant if the laser and nonlinear crystal are arranged to generate ultraviolet (UV) laser radiation. Most available nonlinear crystals have a significantly lower damage threshold when exposed to UV laser radiation compared to lower frequency laser radiation. As a result, high intensity of UV radiation on the exit face of a nonlinear crystal causes rapid degradation of that component, limiting the reliability of the laser system. Thus, there is a need in the art for methods and systems for reducing surface damage in nonlinear crystals used for efficient, high power frequency conversion of laser light.

An object of the present invention is to provide a method of reducing surface damage in a nonlinear crystal.

SUMMARY OF THE INVENTION

Accordingly, the present invention relates to a system including: a laser means for generating input light, and a nonlinear crystal having a first face end and a second face end opposite to the first face end, a first length portion and a second length; the nonlinear crystal disposed to receive the input light at the first face end for converting the input light into frequency converted light and for providing the frequency converted light at the second face end; wherein the nonlinear crystal is configured so that the first length portion of the nonlinear crystal is phase matching for the input light and the frequency converted light, and the second length portion of the nonlinear crystal is phase mismatching for the input light and the frequency converted light.

Another aspect of the present invention relates to a device including a nonlinear crystal for converting input light into converted frequency light, wherein the nonlinear crystal has first and second length portions, and a phase matcher disposed in proximity of the first length portion of the nonlinear crystal for maintaining phase matching of the input light and the converted frequency light therein, and a phase mismatcher disposed in proximity to the second length portion of the nonlinear crystal for changing a refractive index and enabling phase mismatching of the input light and the converted frequency light therein.

Another feature of the present invention provides a method of frequency conversion, including: (a) providing a nonlinear crystal configured to receive input light and generate frequency converted light, and to provide phase matching of the input light and the frequency converted light in a first portion of the nonlinear crystal; (b) in a second portion of the nonlinear crystal, providing phase mismatching of the input light and the frequency converted light therein, wherein the phase matching in the first portion of the nonlinear crystal is maintained; and, (c) providing the input light to the nonlinear crystal and receiving the frequency converted light therefrom.

BRIEF DESCRIPTION OF THE DRAWINGS

The invention will be described in greater detail with reference to the accompanying drawings wherein the same numerals represent the same elements.

DETAILED DESCRIPTION

An effective means for improving reliability of the exit face of a nonlinear crystal is reducing light intensity on this surface. One approach to reducing the exit face intensity is to use a longer crystal; however, the simple extension of the length of the crystal leads to many changes in the generated beam characteristics, such as beam propagation factor M$^2$, waist astigmatism, waist asymmetry, and conversion efficiency. While adjusting parameters such as waist position and waist size within this nonlinear crystal can potentially compensate for some of the negative effects, the resulting beam quality is typically compromised.

Numerous factors must be considered when calculating potential reduction in intensity on the exit face of the nonlinear crystal, including focused spot size and shape, crystal length, angle of incidence, and $M^2$. However, using the standard Boyd and Kleinman focusing parameter 4, a generalized formulation independent of crystal length can be derived.

Figure 1:
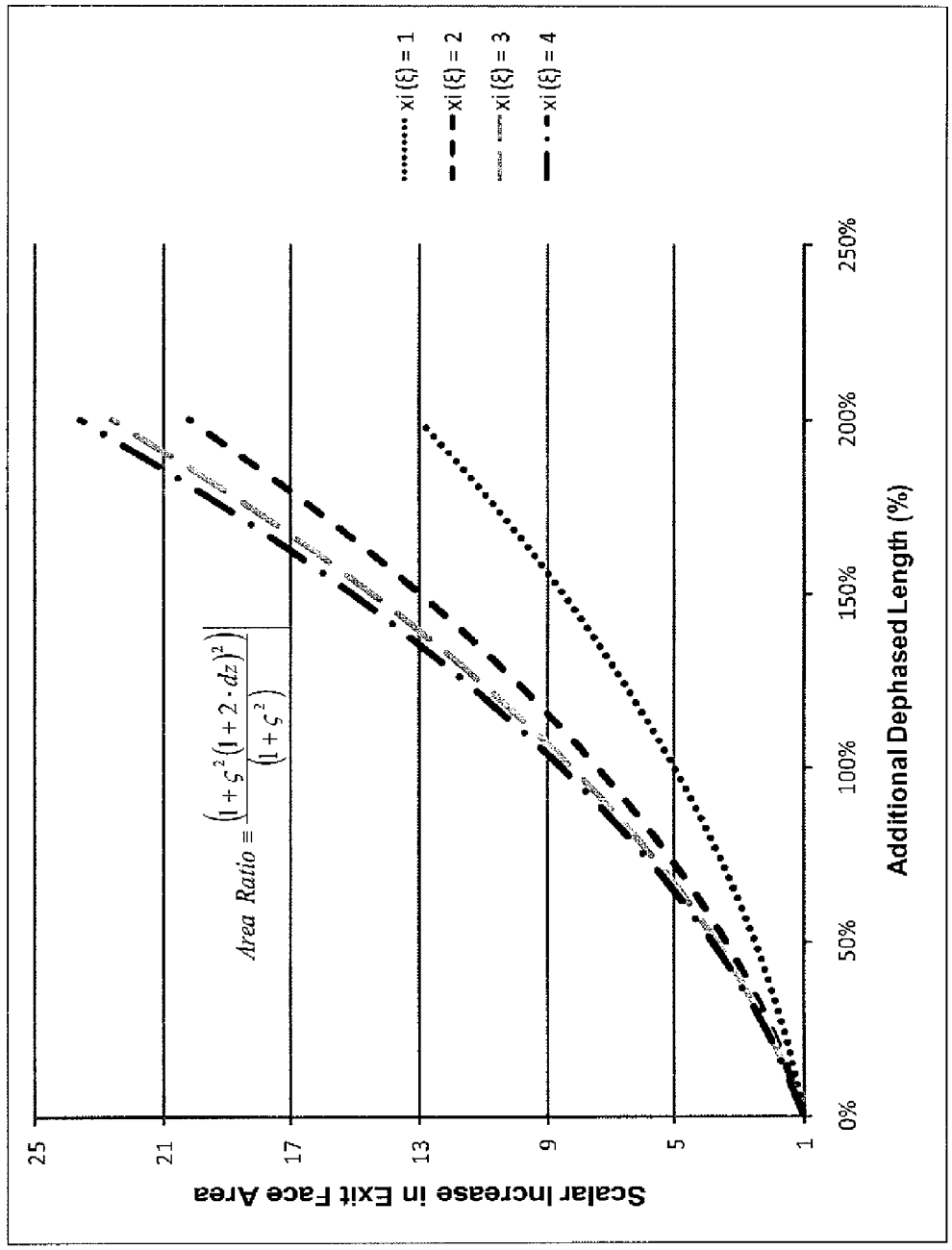
FIG. 1 is a plot of increase in exit surface area when a given nonlinear crystal is increased in length.

Simulated results presented in FIG. 1 show how the exit surface area increases when the length of a nonlinear crystal grows. Four cases, $\xi=1, 2, 3, 4$, are evaluated for increasing the crystal length between zero and 200%. Assuming a round focus spot, normal incidence and $M^2=1$, FIG. 1 depicts the increase in area achievable by increasing the crystal length by a percentage, dz, of the original crystal length, for several focus conditions described by the Boyd and Kleinman focusing parameter $\xi$. As intensity scales inversely with beam area, FIG. 1 indicates that doubling the length of the crystal can decrease the intensity on the exit face by a factor of greater than 5, even with moderately loose focusing; while tripling the length of the nonlinear crystal can decrease the intensity on the exit face by a factor of greater than 10.

It is possible to design a nonlinear crystal having an extended length with only minimal effects to the beam quality and efficiency of the generated radiation. For this purpose, phase-matching conditions may be maintained in a first length portion of the crystal while phase-mismatching conditions arranged in the remaining length of the crystal. The phase-mismatching means used for this purpose tinker with the effective coefficient of refraction within the crystal as little as to facilitate phase mismatching of the input light and frequency converted light, but do not change the direction of the light beam within the crystal so as to allow essentially uncompromised free propagation in this second length portion of the crystal. This approach results in great improvement of exit face reliability, which happens due to reduced intensity caused by the natural beam expansion that occurs during free propagation following a beam waist.

Prior to this invention, the effect of thermal phase mismatching, e.g. self-induced thermal phase mismatching described in "Influence of Self-Induced Thermal Effects on Phase Matching in Nonlinear Optical Crystals," Masakatsu Okada and Shogo Ieiri, IEEE of Quantum Elecron., col. QE-7, No. 12, pp. 560-563, December 1971, has been regarded as a negative effect decreasing the intensity of generated light. Various compensatory techniques have been suggested, for example in U.S. Pat. No. 7,324,267. According to this invention, a portion of the crystal is intentionally configured so as to attain phase mismatching condition and to employ this condition to achieve a desirable effect, i.e. to distance the crystal exit surface from the first crystal portion where the most of frequency conversion happens. The length of the second crystal portion must to be sufficient for increasing the beam diameter so as to eliminate damage of the end surface of the crystal when the beam finally reaches it. It is essential that the frequency conversion and expansion of the beam happen within a same crystal without any surfaces therebetween which, if present, would deteriorate from the higher intensity of light.

Advantageously, this invention extends the life of high-power systems generating ultraviolet harmonics, which is especially important because of tight focusing typically happened in such systems and poor reliability of nonlinear materials when exposed to high-intensity ultraviolet radiation.

Figure 2:
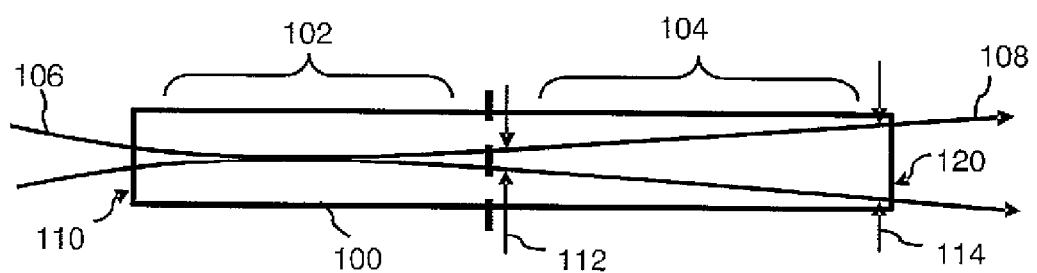
FIG. 2 is a diagram illustrating the invention.

FIG. 2 illustrates the concept of the invention. With reference to FIG. 2, as a laser beam propagates from an input face end 110 of a partially phase-mismatched nonlinear crystal 100 to an exit face end 120, a portion of input light 106 is converted into frequency converted light 108, which leaves the crystal through the exit face 120 together with a remaining portion of the input light 106. The nonlinear crystal 100 has two length portions: a first length portion 102 adjacent to the input face end 110 and a second length portion 104 adjacent to the second face end 120.

The frequency conversion of laser light in nonlinear crystals is widely used and include frequency doubling, sum and difference frequency generation, parametric amplification and oscillation, and four-wave mixing. A necessary condition for effective phase conversion is phase matching relationship between the interacting waves.

The term "phase matching" is conventionally used in the art. Phase-matched frequency conversion is understood to mean that the phase velocities of the input and converted beams in the nonlinear medium satisfy a relationship whereby the net phase mismatch of the beams over the interaction length is small enough (typically less than roughly one wave of the converted beam) that a significant net frequency conversion occurs between the input and the converted beam. In the case of conversion of plane waves, the precise criterion is that $|\Delta k L| < pi$, where $\Delta k$ is the wavevector mismatch, which is defined as k_out−sum(k_in) wherein the sum is over possibly multiple input waves, and L is the interaction length, which in the current situation could be the first length portion 102 or the second length portion 104, for example.

A variety of phase-matching techniques may be used for creating the phase matching condition in the first length portion 102 of the nonlinear crystal 100, including birefringent phase matching, critical phase matching using an angular adjustment of the crystal, noncritical phase matching, non-collinear phase matching, etc.

In one embodiment, the phase-matching is achieved by a combination of angular and temperature adjustment. The crystal type and geometry are chosen so that at a certain temperature and propagation angle, phase-matching is achieved. In operation, the crystal is configured for rough phase-matching using angular adjustment; then it is fine tuned using temperature control so as to hold a temperature controlled crystal near the design temperature. Since the angle is locked mechanically, the temperature is maintained with a control circuit in order to avoid performance changes with changes of the ambient temperature.

Alternatively, non-critical phase-matching may be used, where the crystal cut is such that the beam is aligned roughly along the propagation axis of the crystal and temperature is used to phase-match the crystal.

In accordance with this invention, the nonlinear crystal 100 is a partially phase-mismatched nonlinear crystal. Only the first length portion 102 of the nonlinear crystal 100 is configured to provide phase matching of the input light 106 and the frequency converted light 108 as the former is being converted into the latter and they propagate together within the first length portion 102 of the crystal. Differently from the first length portion 102, the second length portion 104 provides phase mismatching of the input light 106 and the frequency converted light 108 as they propagate together within the second length portion 104 of the crystal. According to this invention, the first and second length portions of the crystal do not intersect, i.e. no part of the first portion belongs to the second portion and vice versa.

The term "phase mismatching" refers to any situation in which multiple beams are propagating in a nonlinear medium in such a way that their relative phase mismatch is large enough that no significant net frequency conversion occurs between the input and the converted beams. Such phase mismatching may occur at any point where the phase mismatch is greater than typically around one wave of the converted beam, but in the current invention the desired phase mismatch would typically be on the order of 10 waves or more in order to ensure that in the phase-mismatched region there is minimal interaction among the beams.

The length of the phase matching length portion 102 is preferably the optimal length for highest frequency conversion, which is determined by the methods known in the art and depends on parameters of the input light beam and on the frequency of converted light; it will typically vary between 3 and 30 millimeters. The length of the phase mismatching portion 104 should be sufficient to increase the diameter of the light beam so that the intensity of the frequency converted light on the exit face 120 is below the surface damage threshold or as low as practical limits allow, given constraints on available crystals. In the case of LBO, the maximum length commonly available is approximately 60 millimeters, depending on chosen crystal orientation. In this example, the second length portion 104 may vary between 30 and 57 millimeters; in other words, the mismatching portion may constitute 50-95% of the total crystal length. In practice, one can trade crystal cost for area expansion and design for second length portions in the 5-49% of the total crystal length as well.

Various nonlinear crystals, having naturally different material properties, can be phase-mismatched using various approaches. For example, by controlling the temperature profile in a nonlinear crystal, or by applying electric field to a crystal and using the electro-optical effect. Alternatively, selective pressure can be applied to the crystal so as to employ the peizo-electric effect. The effect provided by the mismatcher essentially does not change the refractive coefficient, but creates only subtle changes to induce phase mismatching. Furthermore, the effect of total internal reflection can be used to change the direction of propagation of light relative to the crystal axes.

The presence of the phase mismatching crystal portion 104 allows increasing the diameter of the laser beam and lessening intensity of light on the exit face 120. The reduction of intensity of light is indicated by the increase in beam diameter from a beam diameter 112 at the transition from the first length portion 102 to the second length portion 104 to a beam diameter 114 near the exit face 120.

By way of example, the input light 106 includes 532 nm and 1064 nm input beams. In the first length portion 102, the nonlinear crystal enables sum frequency generation of the frequency converted light 108 which of 355 nm UV light.

Advantageously, the method of this invention provides a sufficient increase in beam area on the exit face 120 of a nonlinear crystal 100 compared to the input face 110; it allows great flexibility in adjusting parameters of the crystal 100, including a crystal length, and focus spot size and shape so as to fully optimize the nonlinear conversion design for a specific purpose. By way of example, an increase in a waist size or forming a highly asymmetric waist, which conventionally would cause an increase in light intensity on the exit surface 120, can be at least in part compensated with a longer crystal by allowing additional beam expansion, thereby widening the light beam within the second length portion of the crystal.

Figure 3:
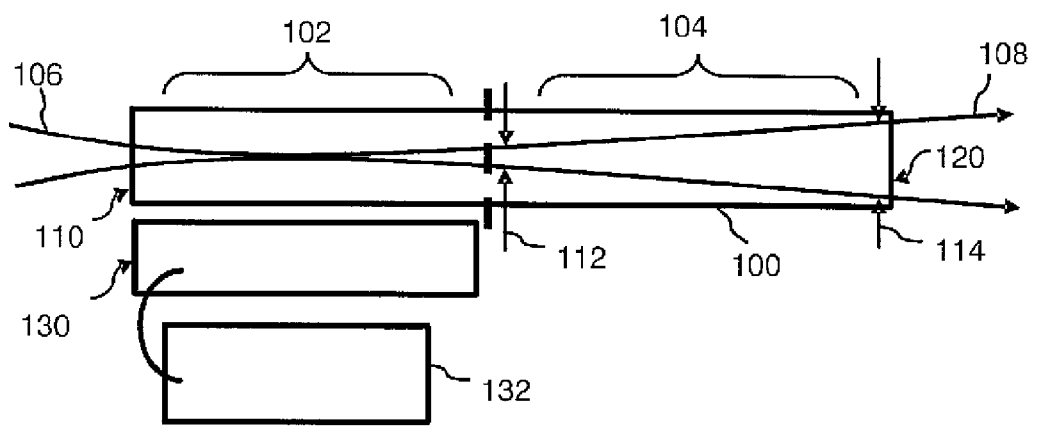
FIG. 3 is a diagram of one embodiment of the invention.

In one embodiment illustrated by FIG. 3, the phase matching condition in the first length portion 102 of the nonlinear crystal 100 is maintained using a temperature controlling component 130, e.g. a mounting surface, which controls local temperature of the crystal and is controlled by a temperature control circuit 132, which may be a part of a temperature controller. By way of example, the temperature controlled phase matching is described in U.S. Pat. No. 5,179,562 incorporated herein by reference.

In the second length portion 104, the temperature is not controlled and the second portion 104 of the crystal is allowed to gradually cool down/warm up to the temperature of the surrounding region. While the phase matching in the first length portion 102 requires a specific temperature, the temperature in the second length portion 104 may vary as soon as it is sufficiently different from the temperature required for phase matching. For LBO, 5 degrees Celsius is typically sufficient to achieve phase mismatching. This might be enhanced with air-flow provided by a fan that improves convective cooling efficiency at the surface of the second length portion 104 of the nonlinear crystal 100. In the case of a sealed chamber that holds the crystal assembly of FIG. 3, the air-flow may be derived from a chamber gas purging system.

Depending on the specific nonlinear conversion scheme, parameters that need optimization are the temperature difference between the first and second length portions 102 and 104 of the crystal 100 and the steepness of the temperature gradient between the length portions.

Figure 4A:
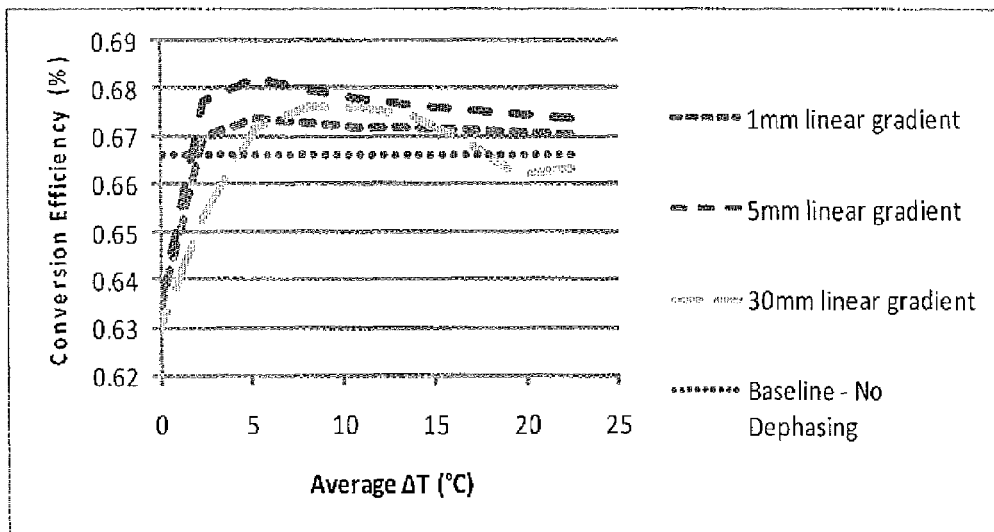
FIG. 4A is a plot of conversion efficiency vs. average temperature difference between the phase-matched and phase-mismatched regions of a nonlinear crystal.
Figure 4B:
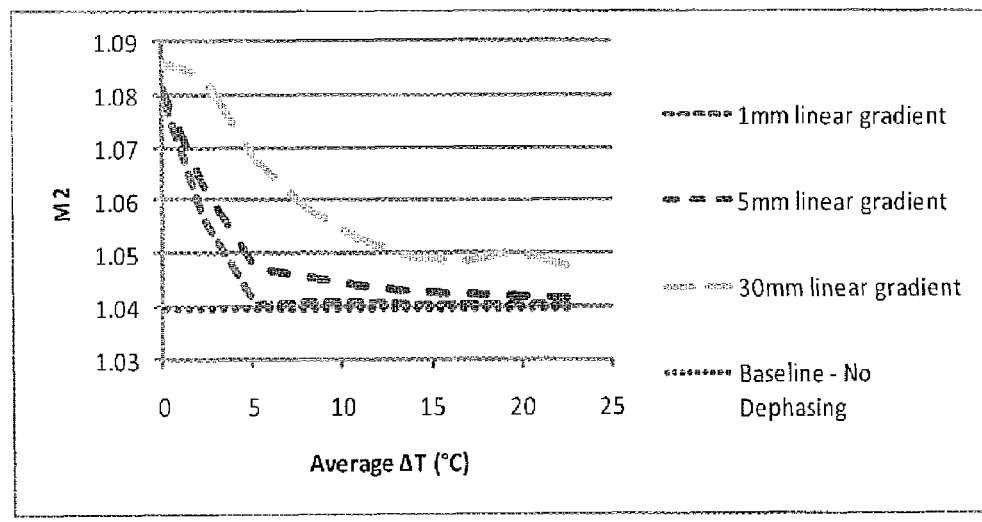
FIG. 4B is a plot of M$^2$ vs. average temperature difference between the phase-matched and phase-mismatched regions of a nonlinear crystal.

FIGS. 4A and 4B relate to analysis of conversion efficiency and $M^2$ vs. average temperature difference between the phase-matched and phase-mismatched regions of a nonlinear crystal. The baseline performance of a nonlinear conversion scheme using a 20 mm Lithium triborate (LBO) crystal with no dephasing is compared with a 50 mm LBO crystal design with no change in focusing but with varied temperature transition lengths, i.e. different thermal gradients, between the phase-matched and phase-mismatched regions. In this example, it is expected that providing phase mismatching conditions in the second length portion of the crystal would result in at least 80% decrease of light intensity on the surface of the exit face 120 in comparison with a shorter crystal wherein phase matching condition is maintained along the whole crystal, while maintaining similar performance in each case. In FIGS. 4A and 4B, nominal performance of a design without a second length region is represented by the flat dotted reference line, conversion efficiency of approximately 66.5% and approximately $M^2$=1.04. The other lines represent three cases where different thermal gradients between the first and second length portions of the crystal have been simulated in order to understand the dependence of performance on the thermal profile and the typical temperature difference required for phase mismatching in this example with LBO. The conclusion drawn is that a temperature difference greater than 5 degrees Celsius is sufficient to preserve performance and that the device is not highly sensitive to steepness of the thermal gradient between the first and second length portions of the crystal.

In general, it is expected that the addition of a second length portion providing phase mismatching condition would result in increase of the beam diameter and decrease by at least 20% the intensity of light on the surface of the exit face 120 without significantly changing beam propagation characteristics in comparison with a shorter crystal maintaining phase matching condition along the whole crystal and providing the same nonlinear conversion efficiency as the crystal of this invention.

FIGS. 4A and 4B indicate that $M^2$ is least affected by a short, steep temperature gradient, while a much longer gradient impacts beam quality regardless of the temperature delta analyzed, while conversion efficiency is relatively insensitive to thermal gradient. Within the constraints imposed by the physical embodiment, the temperature difference of greater than 5° C. over a span of approximately 5 millimeters preserves beam parameters and conversion efficiency without causing excessive thermal-mechanical stress on the nonlinear crystal.

Figure 5:
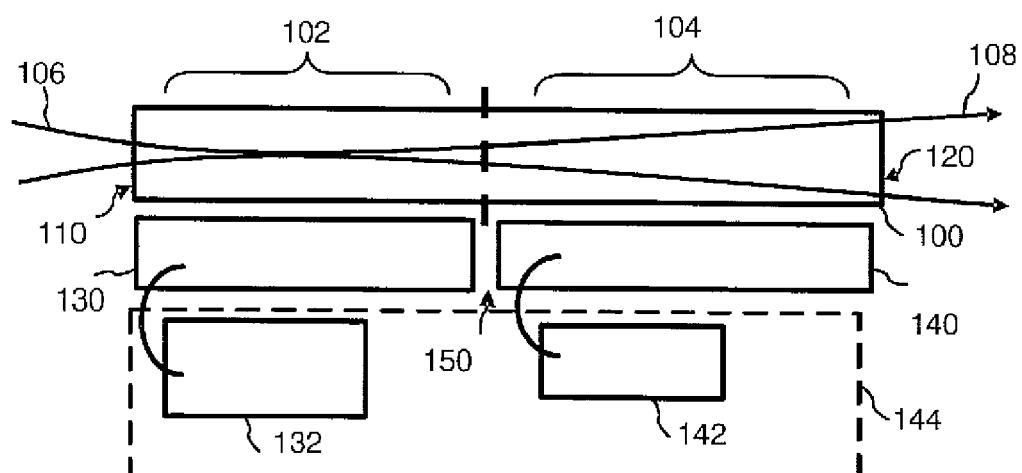
FIG. 5 is a diagram of one embodiment of the invention.

FIG. 5 illustrates another embodiment of the invention, where the temperature is directly controlled in both length portions 102 and 104 so as to achieve the better performance by controlling the thermal profile between the first and second length portions of the crystal, portions 102 and 104. This can be accomplished by using an additional temperature controlling component 140, e.g. a mounting surface adjacent to the second length portion 104, controlled by a control circuit 132. The temperature control circuits 132 and 142 for a temperature controller 144. By way of example with LBO, the minimal difference in temperature between the first and second portions of the crystal may be 5 degrees Celsius.

The ability to separately control the temperature controlling components 130 and 140, and to vary a space 150 between the two components gives the designer full control of the thermal gradient between the first and second length portions 102 and 104 and, thus, the ability to optimize optical performance as discussed above with reference to FIGS. 4A and 4B.

In one embodiment, the temperature controlling components 130 and 140 may be joined into a single temperature controlling component.

Figure 6:
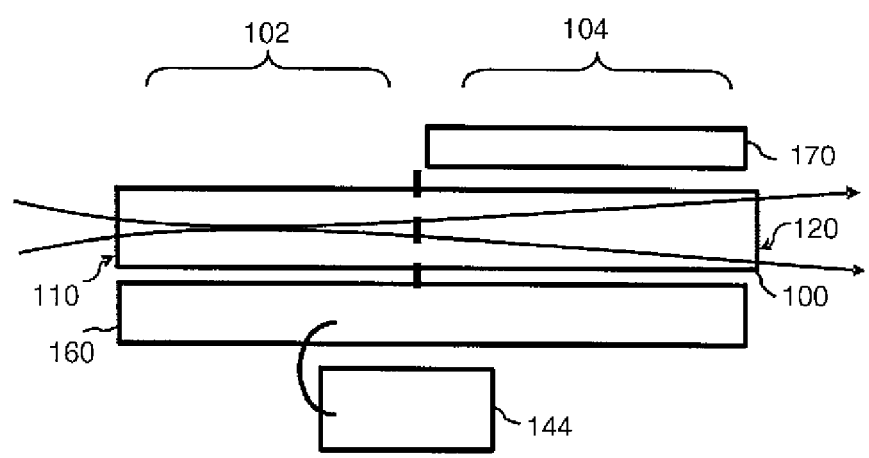
FIG. 6 is a diagram of one embodiment of the invention.

With reference to FIG. 6, the method of this invention may be embodied in a pressure dephased nonlinear crystal assembly. The nonlinear crystal 100 is attached to a single temperature controlling mounting surface 160 and configured such that the first length portion 102 maintains phase-matching. To provide the phase mismatching condition in the second length portion 104 of the crystal 100, a clamping plate 170 applies a predefined force so as to establish a pressure gradient between the first and second length portions 102 and 104, where the first length portion 102 is nominally stress free.

Figure 7:
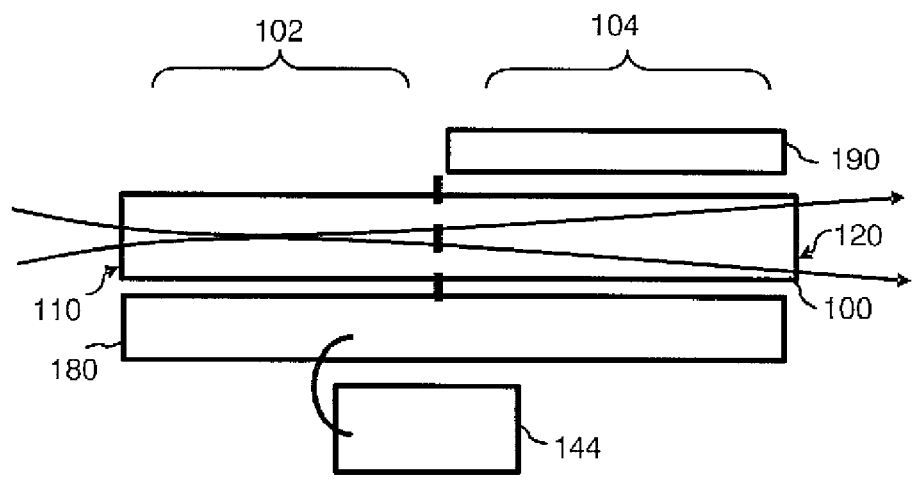
FIG. 7 is a diagram of one embodiment of the invention.

In another embodiment illustrated by FIG. 7, the nonlinear crystal 100 is attached to a single temperature controlling mounting surface 180 capable of supporting a voltage difference induced by an opposing electrode 190. The first length portion 102 is configured to maintain phase-matching and nominally free of this created electric field, while the induced electric field phase-mismatches the second length portion 104 of the crystal 100.

In order to minimize undesired effects, the aforedescribed techniques may be used in combination. By way of example, using moderate clamping force along with a temperature gradient, one can achieve a desired level of phase mismatching without over-stressing the crystal.

Figure 8:
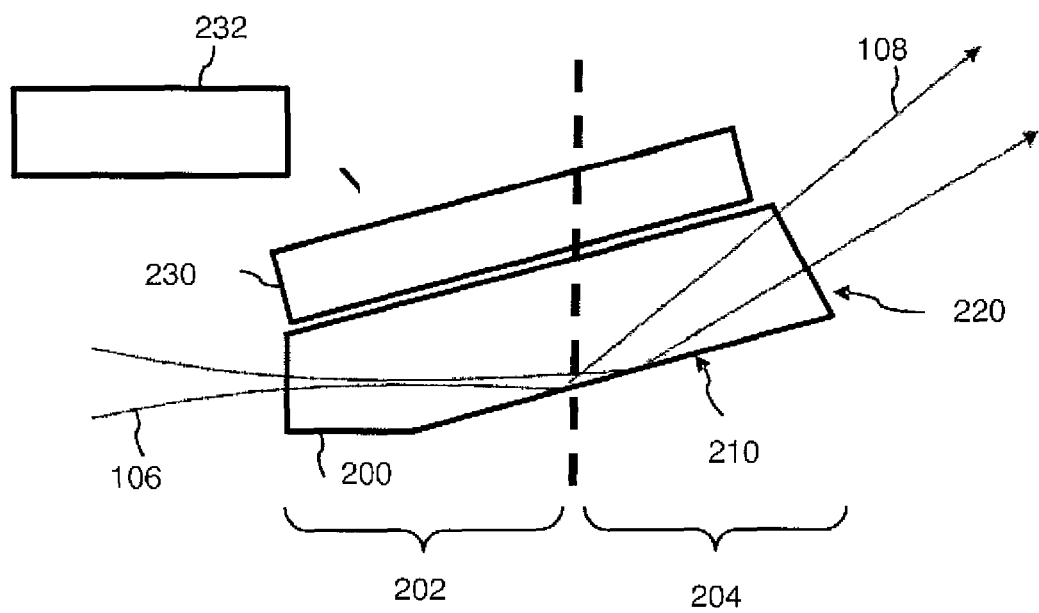
FIG. 8 illustrates phase-mismatching by using total internal reflection.

FIG. 8 illustrates the embodiment where the phase-mismatching condition in the second length portion of the crystal is achieved by a predefined cut of the crystal so as to reflect a portion of the input light and change a direction of beams of the input light and the frequency converted light. A nonlinear crystal 200 has a first length portion 202 nominally phase-matched by attachment to a single temperature controlling mounting plate 230 controlled by a controller 232, as it is described above with reference to FIGS. 3 and 5-7, and by aligning the crystal relative to a laser means which generate the input light beam 106.

The nonlinear crystal 200 has a predefined cut so that a surface 210 provides a total internal reflection of a portion of the input light beam 106 and frequency converted light beam 108. In result, the light beams change their direction causing the phase-mismatching condition in the second length portion 204 of the nonlinear crystal 200. Parameters of the predefined cut depend on the crystal material, the geometry of the input beam and may be determined by experiment or using computer simulation, e.g., using commercially available software such as Zemax.

Alternatively to using the effect of total internal reflection, the surface 210 of the crystal 200 is coated with a reflector, e.g. aluminum, so as to reflect a portion of the input light, change a direction of light beams, and cause the phase mismatching condition in the second length portion 204 of the nonlinear crystal 200.

Since the crystal is configured such that phase-matching is achieved while propagating along the initial beam path, the change in propagation direction after the reflection from the surface 210 phase-mismatches the crystal by change of angle.

In this embodiment, the conversion of the input light and generation of the frequency converted light occurs in the first length portion 202 of the crystal 200, then the beam reflects at the surface 210, then phased-mismatched by the angle change, expands throughout the remaining length 204 of the crystal until passing through the exit face 220, as shown in FIG. 8.

The method of this invention is not specific to any particular laser system or nonlinear crystal material. The nonlinear crystals with phase matching and mismatching means as described above can be placed outside of a laser means or within a laser resonator with appropriate resonator mirrors to transmit the generated harmonic and reflect the fundamental resonant beam as needed by the specific design.

Figure 9:
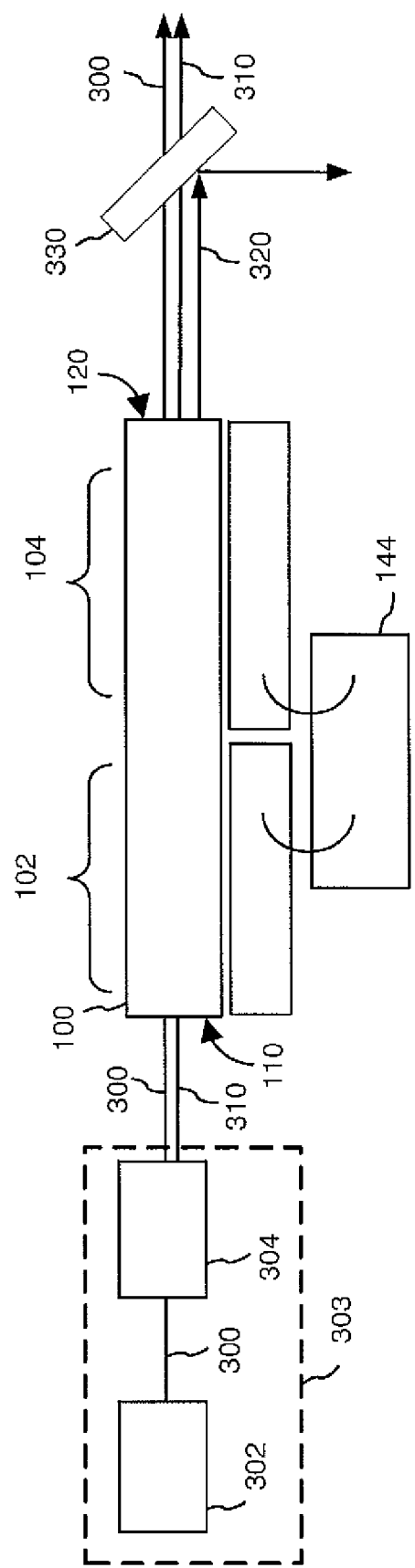
FIG. 9 illustrates an external sum frequency generation scheme.

FIG. 9 illustrates a generalized external sum frequency generation scheme including a nonlinear crystal 100 disposed externally to a laser means 303, the latter includes a laser source 302 emitting fundamental radiation 300 of frequency $\omega$ and a second harmonic generator 304, which converts a portion of the fundamental to a second harmonic 310 of frequency $2\omega$. therefore input light reaching the face end 110 of the crystal 100 comprises light of two wavelengths.

The partially phase-mismatched crystal 100 converts a portion of the input light combined from the $\omega$ and $2\omega$ harmonics to a third harmonic 320 of frequency $3\omega$ by sum frequency generation; a harmonic splitting device 330 reflects the third harmonic 320 and transmits remaining fundamental and second harmonics.

Figure 10:
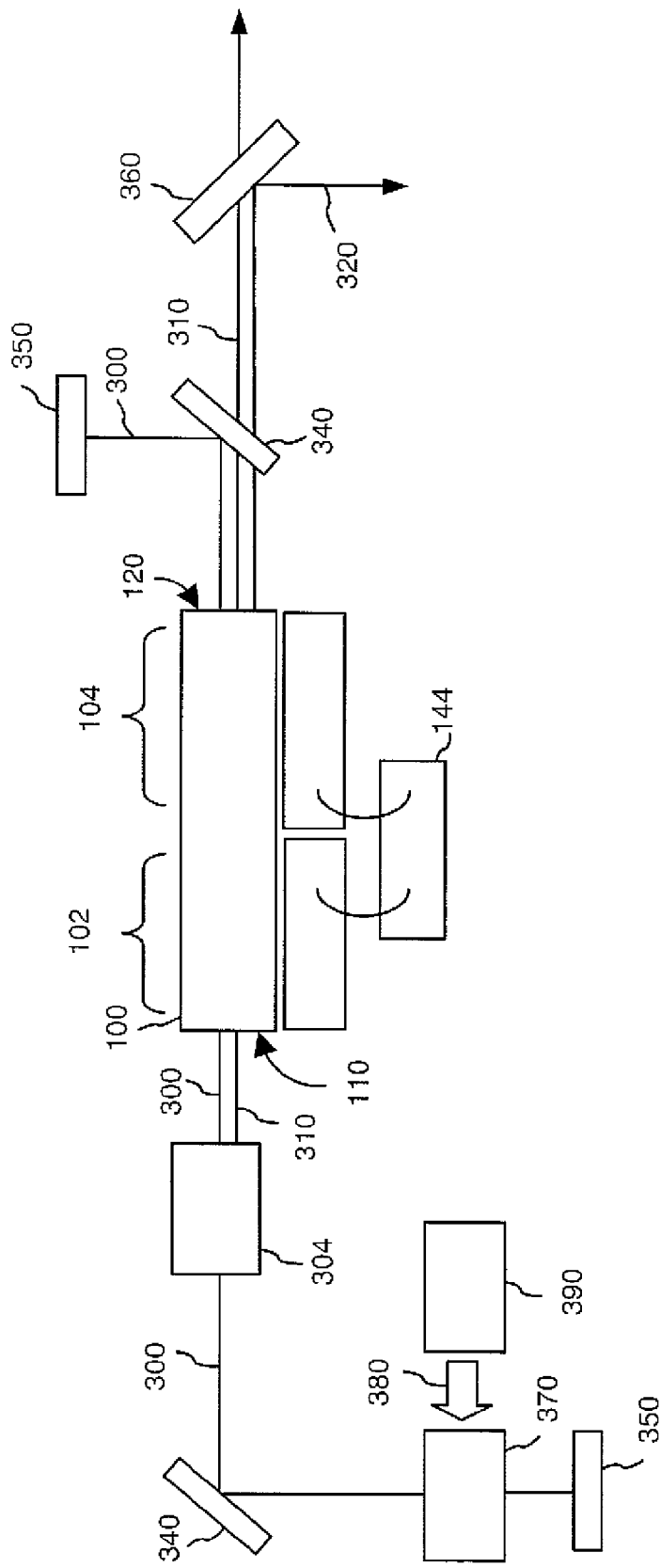
FIG. 10 illustrates an internal sum frequency generation scheme.

FIG. 10 illustrates a generalized internal sum frequency generation scheme wherein the nonlinear crystal 100 is disposed within a laser means, more particular, in a laser resonator between mirrors 350. A gain medium 370, pumped by an external source 390 of energy 380, generates radiation 300 of the fundamental frequency $\omega$. The optical mirrors 340 provide high reflectivity at the fundamental frequency to and high transmittance at the generated harmonic frequencies $2\omega$ and $3\omega$, mirrors 350 are designed for high reflectivity at the fundamental frequency $\omega$, and a mirror 360 separates the converted light 320.

With reference to FIGS. 9 and 10, the partially phase-mismatched crystal 100 may be partially mismatched using any aforedescribed means. While FIGS. 9 and 10 illustrate the sum frequency generation, other types of frequency conversion schemes may employ the partially mismatched nonlinear crystal of this invention. In particular, the second harmonic generator 304 may be replaced with a higher harmonic generator if desired. Alternatively, a frequency doubling method, where the second length portion 104 of the nonlinear crystal 100 is for varying a phase between the input light and the frequency converted light so as to provide out of phase output beams, does not require the harmonic generator 304.

In one embodiment, a partially phase mismatched crystal has two phase mismatching portions and one phase matching portion in-between. Such crystal may be useful for intracavity frequency doubling.

We claim:

1. A system comprising:
   a laser means for generating input light;
   a nonlinear crystal having a first face end and a second face end opposite to the first face end, a first length portion and a second length portion; wherein the nonlinear crystal is disposed and sized to receive the input light at the first face end for converting the input light into frequency converted light and for providing the frequency converted light at the second face end; wherein the nonlinear crystal is configured so that the first length portion of the nonlinear crystal is phase matching for the input light and the frequency converted light, and the second length portion of the nonlinear crystal is phase mismatching for the input light and the frequency converted light, so that the input light and frequency converted light within the first length portion are in-phase and so that the input light and frequency converted light are out of phase with one another within the second length portion thereby lessening the power density of light exiting the second end face;
   a first temperature controlling controllable component for configuring the first length portion of the nonlinear crystal to be phase matching for the input light and the frequency converted light; and
   a phase mismatcher for configuring the second length portion of the nonlinear crystal to be phase mismatching for the input light and the frequency converted light, wherein the phase mismatcher comprises a second temperature controlling component.

2. A system as defined in claim 1 wherein the first and second temperature controlling components together form a temperature controlling mounting surface, and wherein the system further comprises a controller for controlling the first and second temperature controlling components of the temperature controlling mounting surface.

3. A system as defined in claim 1 wherein the first and second components are divided by a gap so as to thermally isolate the first component from the second component.

4. A system comprising:
   a laser means for generating input light;
   a nonlinear crystal having a first face end and a second face end opposite to the first face end, a first length portion and a second length portion;
   wherein the nonlinear crystal is disposed and sized to receive the input light at the first face end for converting the input light into frequency converted light and for providing the frequency converted light at the second face end; wherein the nonlinear crystal is configured so that the first length portion of the nonlinear crystal is phase matching for the input light and the frequency converted light, and the second length portion of the nonlinear crystal is phase mismatching for the input light and the frequency converted light, so that the input light and frequency converted light within the first length portion are in-phase and so that the input light and frequency converted light are out of phase with one another within the second length portion thereby lessening the power density of light exiting the second end face;
   a first temperature controlling controllable component for configuring the first length portion of the nonlinear crystal to be phase matching for the input light and the frequency converted light; and
   a phase mismatcher for configuring the second length portion of the nonlinear crystal to be phase mismatching for the input light and the frequency converted light, wherein the phase mismatcher is a fan.

5. A system comprising:
   a laser means for generating input light;
   a nonlinear crystal having a first face end and a second face end opposite to the first face end, a first length portion and a second length portion; wherein the nonlinear crystal is disposed and sized to receive the input light at the first face end for converting the input light into frequency converted light and for providing the frequency converted light at the second face end; wherein the nonlinear crystal is configured so that the first length portion of the nonlinear crystal is phase matching for the input light and the frequency converted light, and the second length portion of the nonlinear crystal is phase mismatching for the input light and the frequency converted light, so that the input light and frequency converted light within the first length portion are in-phase and so that the input light and frequency converted light are out of phase with one another within the second length portion thereby lessening the power density of light exiting the second end face,
   a first temperature controlling controllable component for configuring the first length portion of the nonlinear crystal to be phase matching for the input light and the frequency converted light; and
   a phase mismatcher for configuring the second length portion of the nonlinear crystal to be phase mismatching for the input light and the frequency converted light, wherein the phase mismatcher comprises a clamp.

6. A system comprising:
   a laser means for generating input light;
   a nonlinear crystal having a first face end and a second face end opposite to the first face end, a first length portion and a second length portion; wherein the nonlinear crystal is disposed and sized to receive the input light at the first face end for converting the input light into frequency converted light and for providing the frequency converted light at the second face end; wherein the nonlinear crystal is configured so that the first length portion of the nonlinear crystal is phase matching for the input light and the frequency converted light, and the second length portion of the nonlinear crystal is phase mismatching for the input light and the frequency converted light, so that the input light and frequency converted light within the first length portion are in-phase and so that the input light and frequency converted light are out of phase with one another within the second length portion thereby lessening the power density of light exiting the second end face,
   a first temperature controlling controllable component for configuring the first length portion of the nonlinear crystal to be phase matching for the input light and the frequency converted light; and,
   a phase mismatcher for configuring the second length portion of the nonlinear crystal to be phase mismatching for the input light and the frequency converted light, wherein the phase mismatcher comprises an electrode.

7. A system comprising:
   a laser means for generating input light, and
   a nonlinear crystal having a first face end and a second face end opposite to the first face end, a first length portion and a second length portion;

wherein the nonlinear crystal is disposed and sized to receive the input light at the first face end for converting the input light into frequency converted light and for providing the frequency converted light at the second face end;

wherein the nonlinear crystal is configured so that the first length portion of the nonlinear crystal is phase matching for the input light and the frequency converted light, and the second length portion of the nonlinear crystal is phase mismatching for the input light and the frequency converted light, so that the input light and frequency converted light within the first length portion are in-phase and so that the input light and frequency converted light are out of phase with one another within the second length portion thereby lessening the power density of light exiting the second end face; and, wherein the second length portion of the nonlinear crystal has a predefined cut so as to provide a total internal reflection of the input light and the frequency converted light.

8. A device comprising:

a nonlinear crystal for converting input light into converted frequency light, wherein the nonlinear crystal has first and second length portions, and a phase matcher disposed in proximity of the first length portion of the nonlinear crystal for maintaining phase matching of the input light and the converted frequency light therein, and a phase mismatcher disposed in proximity to the second length portion of the nonlinear crystal for enabling phase mismatching of the input light and the converted frequency light therein;

wherein the phase matcher and phase mismatcher form a temperature controlling board and wherein the device further comprises a controller.

\* \* \* \* \*